| (12) | United States Patent | (10) Patent No.: | US 9,473,519 B2 |
|---|---|---|---|
| | Gnanasekar et al. | (45) Date of Patent: | *Oct. 18, 2016 |

(54) SYSTEM, METHOD, AND COMPUTER PROGRAM PRODUCT FOR IDENTIFYING UNWANTED DATA COMMUNICATED VIA SESSION INITIATION PROTOCOL

(71) Applicant: McAfee, Inc., Santa Clara, CA (US)

(72) Inventors: Senthilraj Gnanasekar, Chennai (IN); Javesh Kandappamkattil Sreedharan, Kerala (IN); Amalan Mariajohn, Chennai (IN)

(73) Assignee: McAfee, Inc, Santa Clara, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/221,724

(22) Filed: Mar. 21, 2014

(65) Prior Publication Data

US 2014/0215623 A1 Jul. 31, 2014

Related U.S. Application Data

(63) Continuation of application No. 13/589,691, filed on Aug. 20, 2012, now Pat. No. 8,713,678, which is a continuation of application No. 12/055,081, filed on Mar. 25, 2008, now Pat. No. 8,266,693.

(51) Int. Cl.
  *G06F 11/00* (2006.01)
  *H04L 29/06* (2006.01)

(52) U.S. Cl.
  CPC ......... *H04L 63/1408* (2013.01); *H04L 63/145* (2013.01); *H04L 63/1416* (2013.01); *H04L 63/1441* (2013.01); *H04L 65/1006* (2013.01); *H04L 65/1079* (2013.01)

(58) Field of Classification Search
  CPC ... H04L 63/123; H04L 63/126; H04L 63/14; H04L 63/1408; H04L 63/1416; H04L 63/1425; H04L 63/04; H04L 63/0485; H04L 63/1433; H04L 63/1441; H04L 63/145; H04L 63/1466; H04L 63/1483; H04L 63/1491
  USPC ......... 726/11–13, 22–25; 713/150, 153–154, 713/160–163, 166–167, 188
  See application file for complete search history.

(56) References Cited

U.S. PATENT DOCUMENTS

| 7,002,943 | B2 | 2/2006 | Bhagwat et al. |
| 7,372,957 | B2 * | 5/2008 | Strathmeyer et al. ... 379/265.01 |
| 7,568,224 | B1 | 7/2009 | Jennings et al. |
| 7,764,697 | B2 | 7/2010 | Rana et al. |
| 7,848,231 | B2 | 12/2010 | Hayakawa et al. |
| 8,266,693 | B1 | 9/2012 | Gnanasekar et al. |

(Continued)

OTHER PUBLICATIONS

Notice of Allowance Received for U.S. Appl. No. 12/055,081, mailed on Jul. 26, 2012, 7 pages.
Office Action Received for U.S. Appl. No. 12/055,081, mailed on Mar. 1, 2012, 7 pages.

(Continued)

*Primary Examiner* — Hosuk Song
(74) *Attorney, Agent, or Firm* — Blank Rome, LLP

(57) ABSTRACT

A system, method, and computer program product are provided for identifying unwanted data communicated via a session initiation protocol. In use, packets associated with an electronic message communicated over a network utilizing a session initiation protocol are identified. Additionally, it is determined whether the packets include unwanted data. Furthermore, a reaction is performed, based on the determination.

23 Claims, 5 Drawing Sheets

(56) References Cited

U.S. PATENT DOCUMENTS

| | | | |
|---|---|---|---|
| 8,302,186 B2* | 10/2012 | Ormazabal et al. | 726/22 |
| 8,307,418 B2* | 11/2012 | Devdhar et al. | 726/11 |
| 8,356,350 B2 | 1/2013 | Buriano et al. | |
| 8,689,330 B2* | 4/2014 | Sinn et al. | 726/24 |
| 8,713,678 B1 | 4/2014 | Gnanasekar et al. | |
| 2007/0118894 A1* | 5/2007 | Bhatia | H04L 63/1458 726/13 |
| 2009/0147793 A1 | 6/2009 | Hayakawa et al. | |
| 2010/0284282 A1 | 11/2010 | Golic | |

OTHER PUBLICATIONS

Office Action Received for U.S. Appl. No. 12/055,081, mailed on Sep. 29, 2011, 7 pages.

Notice of Allowance received for U.S. Appl. No. 13/589,691, Mailed on Dec. 10, 2013, 7 pages.

Office Action Received for U.S. Appl. No. 13/589,691, Mailed on Aug. 19, 2013, 5 pages.

Office Action Received for U.S. Appl. No. 13/589,691, Mailed on May 23, 2013, 8 pages.

* cited by examiner

SYSTEM, METHOD, AND COMPUTER PROGRAM PRODUCT FOR IDENTIFYING UNWANTED DATA COMMUNICATED VIA SESSION INITIATION PROTOCOL

TECHNICAL FIELD

The present disclosure relates to voice protocols, and more particularly to protocols such as session initiation protocols.

BACKGROUND

Security systems have traditionally been utilized for detecting unwanted data. Such unwanted data has included malware, unsolicited messages, etc. However, traditional security systems have generally exhibited various limitations with respect to detecting unwanted data that utilizes a session initiation protocol (SIP).

For example, voice over Internet Protocol (VoIP) oftentimes employs SIPs for communicating data. Nonetheless, traditional security systems have used techniques customarily incapable of detecting unwanted data communicated via a SIP. Accordingly, unwanted data has been capable of being communicated via a SIP.

There is thus a need for addressing these and/or other issues associated with the prior art.

DETAILED DESCRIPTION

Figure 1:
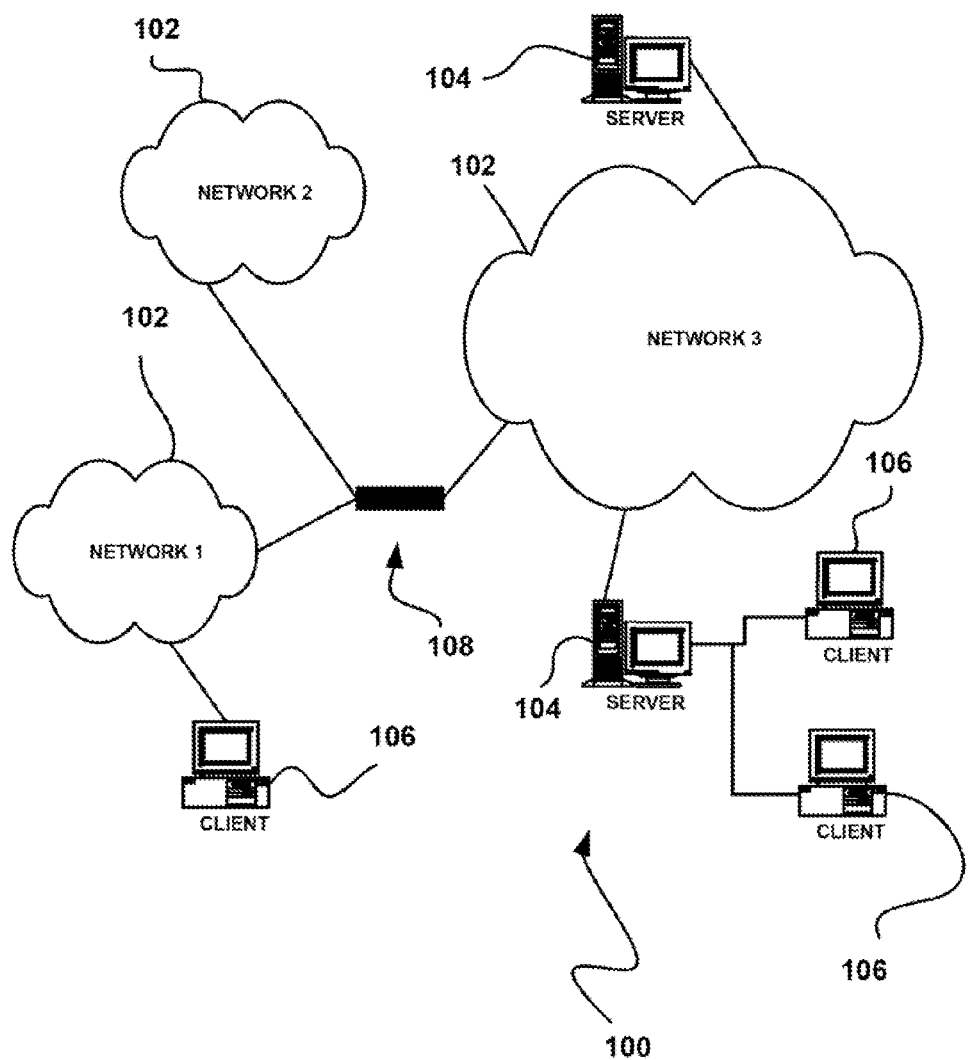
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among others networks 102, at least one gateway 108 is optionally coupled there between.

Figure 2:
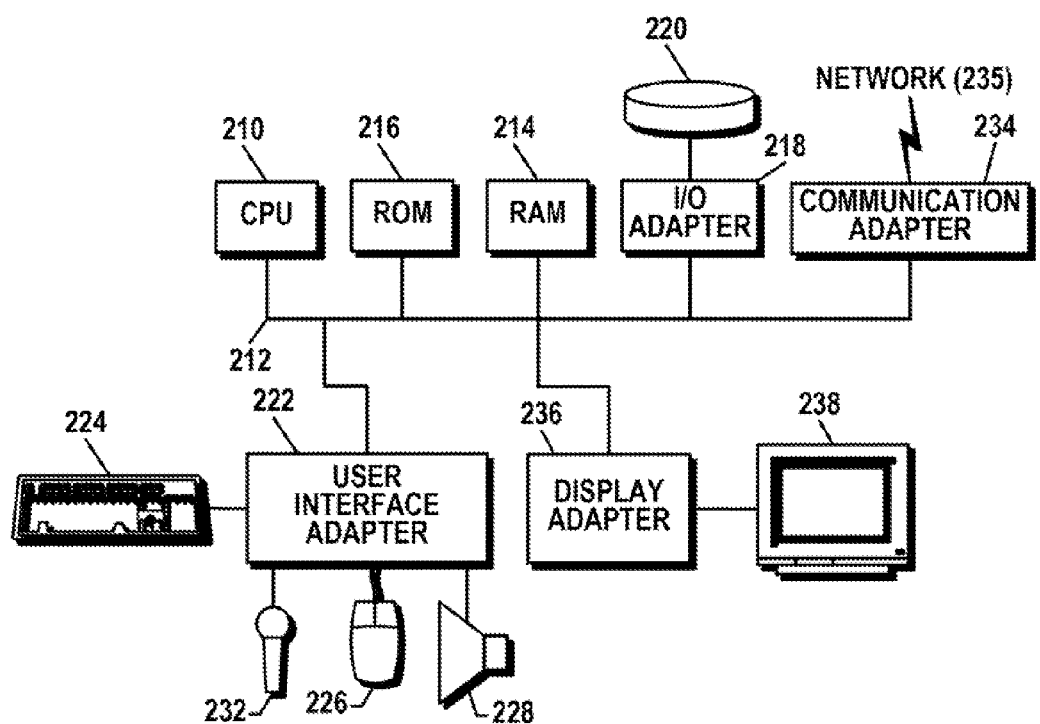
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
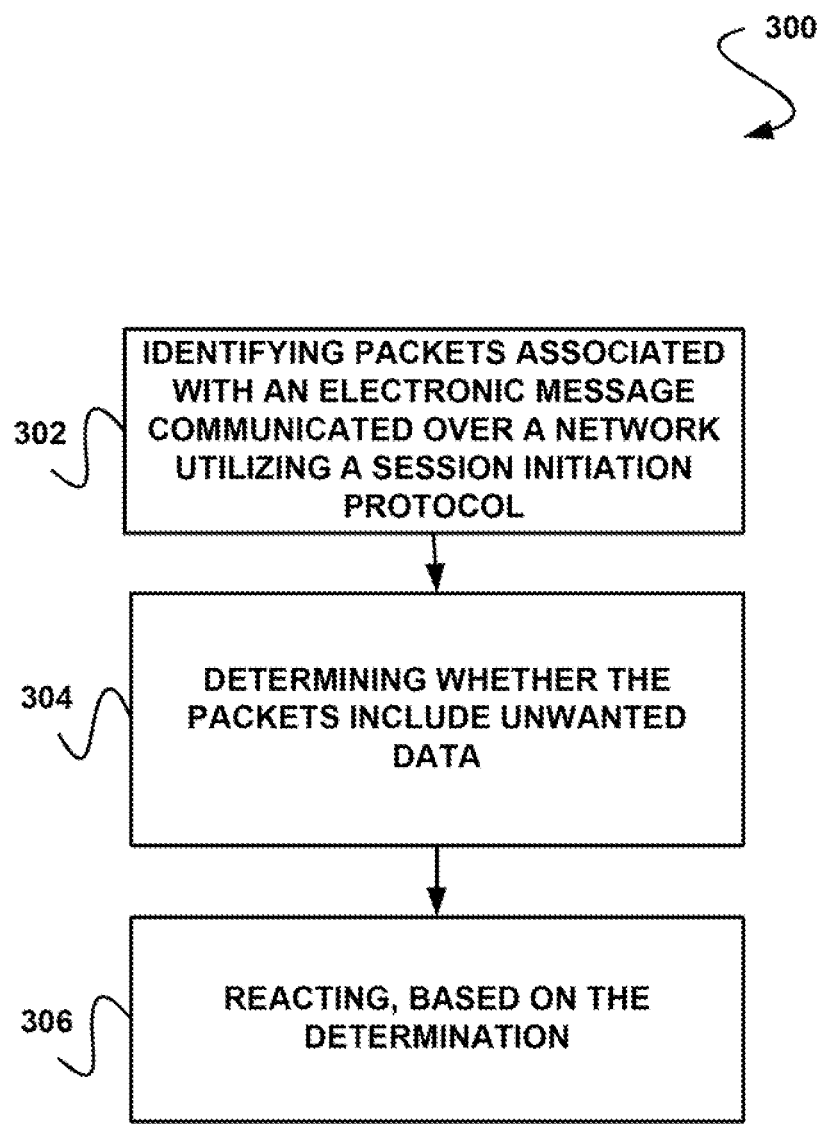
FIG. 3 shows a method for identifying unwanted data communicated via a session initiation protocol, in accordance with one embodiment.

FIG. 3 shows a method 300 for identifying unwanted data communicated via a session initiation protocol, in accordance with one embodiment. As an option, the method 300 may be carried out in the context of the architecture and environment of FIGS. 1 and/or 2. Of course, however, the method 300 may be carried out in any desired environment.

As shown in operation 302, packets associated with an electronic message communicated over a network utilizing a session initiation protocol (SIP) are identified. In the context of the present description, the packets may include any data associated with the electronic message that is formatted as a packet utilizing a SIP. For example, the packets may include data capable of being constructed into the electronic message.

Additionally, in various embodiments, the electronic message may include an electronic mail (email) message, a voice message, etc. Of course, however, the electronic message may include any message that may be communicated electronically over the network. It should be noted that the network may include any of the networks described above with respect to FIG. 1, for example.

As an option, the electronic message may be associated with a voice over Internet Protocol (VoIP) session. The VoIP session may include any session in which voice is communicated over the network. For example, the VoIP session may include communication of the packets between at least two parties.

In one embodiment, the electronic message may include voice communicated as digital audio. In another embodiment, the electronic message may include a voice message communicated via the VoIP session. To this end, the electronic message may optionally utilize the SIP for being communicated with respect to the VoIP session.

As another option, the VoIP session may use the SIP. Just by way of example, a VoIP server via which the VoIP session is initiated may use the SIP. In one embodiment, the VoIP session may use the SIP for communicating the packets over the network.

Further, the SIP may include a protocol for creating, modifying, and/or terminating sessions between at least two parties, in one embodiment. For example, the SIP may be used to create two-party, multiparty, or multicast sessions. In this way, the SIP may optionally be used for initiating the VoIP session.

In addition, the SIP may include an application-layer control protocol, a signaling protocol, etc. For example, the SIP may be used for a signaling portion of the session. As another example, the SIP may optionally be utilized as a carrier for a session description protocol (SDP) describing media content of the session (e.g. the IP ports to use, the codec being used, etc.). To this end, the packets may utilize the SIP for communicating the electronic message within a session (e.g. the VoIP session, etc.).

As another option, the SIP may be independent of an underlying transport layer. Accordingly, the SIP may optionally be used on a transmission control protocol (TCP), user datagram protocol (UDP), stream control transmission protocol (SCTP), etc. As yet another option, the SIP may be text-based. As still yet another option, the SIP may include a peer-to-peer protocol.

Moreover, the packets associated with the electronic message may be identified in any desired manner. In one embodiment, the packets may be identified in response to being received. As an option, the packets may be received from outside of the network. As another option, the packets may be received by a security system device.

As also shown, it is determined whether the packets include unwanted data. Note operation 304. In the context of the present description, the unwanted data may include any data that is unwanted. Just by way of example, the unwanted data may include malware, an unsolicited message, a malicious link (e.g. to a website with malicious content, etc.), etc.

The determination may include comparing the packets to known unwanted data, in one embodiment. Such known unwanted data may include any data predetermined to be unwanted. For example, the known unwanted data may be predetermined by a user to be unwanted. Further, the known unwanted data may be stored in a database.

In this way, it may optionally be determined that the packets include unwanted data if it is determined, based on the comparison, that any portion of the packets match the known unwanted data. Thus, as an option, it may be determined that the packets include unwanted data if one of the packets matches the known unwanted data. Of course, it should be noted that it may be determined whether the packets include unwanted data in any desired manner.

Still yet, as shown in operation 306, a reaction is performed, based on the determination. The reaction may include any action that may be performed based on the determination. As an option, the reaction may be selected among a plurality of actions by a user (e.g. via a user interface, etc.).

In one embodiment, the reaction may include a first action if it is determined that the packets do not include unwanted data. The reaction may include sending the packets to at least one user device (e.g. to which the packets are destined, etc.). As another option, the reaction may include allowing the packets to be communicated over an internal network to a destination designated by such packets.

In another embodiment, the reaction may include a second action if it is determined that the packets include unwanted data. For example, the reaction may include reporting the unwanted data (e.g. to an administrator, etc.). As another example, the reaction may include blocking the unwanted data (e.g. from reaching a user device, such as the user device to which the packets are destined, from being communicated over an internal network, etc.). As still yet another example, the reaction may include alerting the user device to which the packets are destined about the unwanted data.

In this way, unwanted data associated with the electronic message that is communicated over the network utilizing the SIP may be identified. For example, unwanted data associated with a session (e.g. the VoIP session, etc.) that utilizes the SIP may be identified. In one embodiment, the unwanted data may be identified in response to a determination that the packets associated with the electronic message include the unwanted data.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
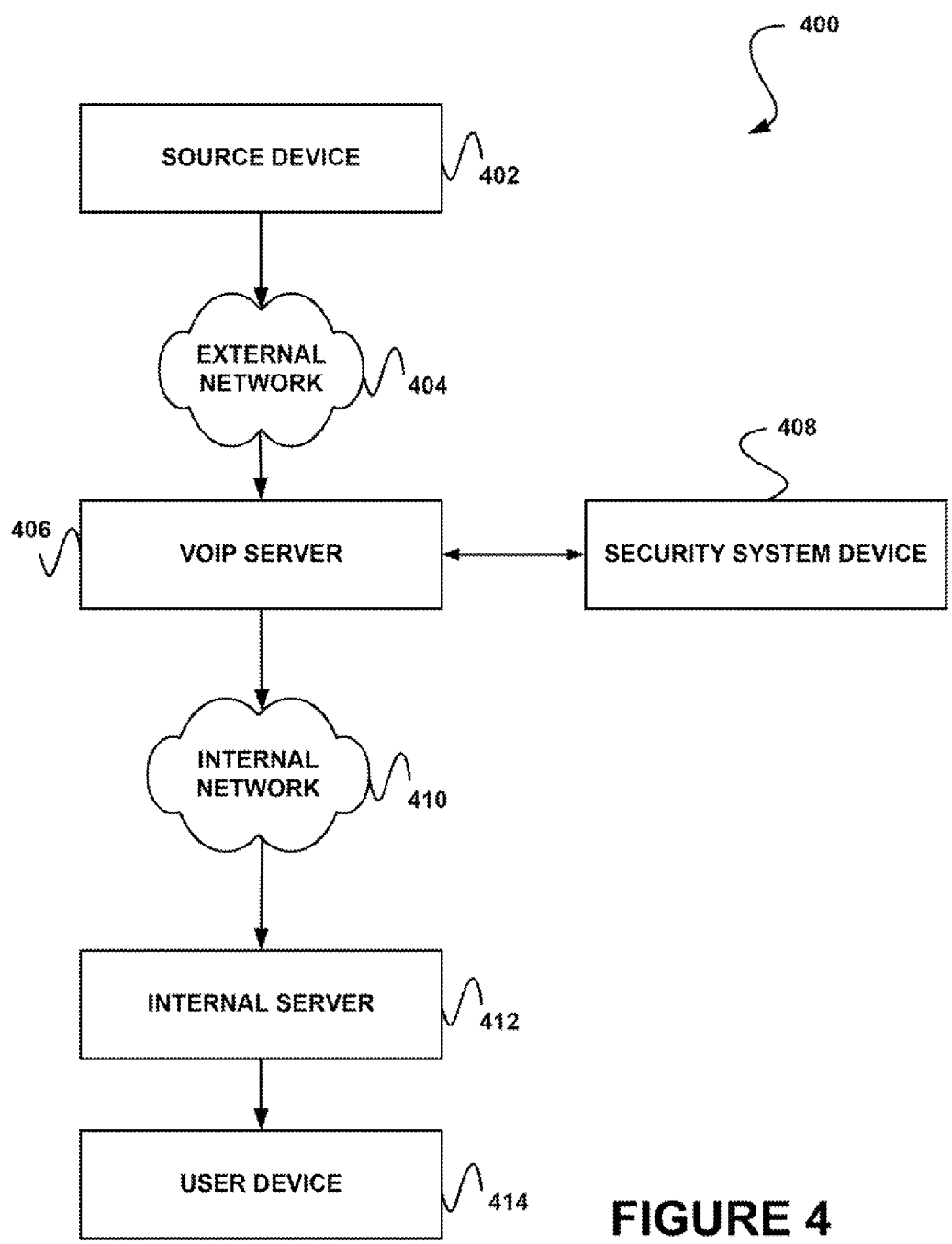
FIG. 4 shows a system for identifying unwanted data communicated via a session initiation protocol, in accordance with another embodiment.

FIG. 4 shows a system 400 for identifying unwanted data communicated via a session initiation protocol, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a source device 402 is in communication with a VoIP server 406 over an external network 404. In the context of the present embodiment, the source device 402 may include any device capable of utilizing a SIP to communicate packets associated with an electronic message over the external network 404. For example, the source device 402 may include any of the devices described above with respect to FIGS. 1 and/or 2.

To this end, the source device 402 may communicate packets associated with the electronic message to the VoIP server 406 over the external network 404, utilizing the SIP. Such external network 404 may include the Internet, as an option. Additionally, the VoIP server 406 may include any device capable of providing VoIP services. For example, the VoIP server 406 may facilitate VoIP sessions between at least two parties. Of course, however, any network server may be utilized with respect to the VoIP server 406 shown.

In one embodiment, the packets communicated from the source device 402 may be routed to the VoIP server 406. In another embodiment, the packets may be routed to the VoIP server 406 for being communicated over an internal network 412 with which the VoIP server 406 is in communication. As an option, a web server, exchange server and/or any other device (not shown) may be coupled to the VoIP server 406.

Further, the VoIP server 406 is in communication with a security system device 408. In the context of the present embodiment, the security system device 408 may include any device capable of determining whether the packets include unwanted data, and reacting based on such determination. For example, the security system device 408 may include a security server. The security system device 408 may optionally include an intrusion prevention system, an anti-virus system, an anti-spyware system, an anti-spam system, etc.

To this end, in response to receipt of the packets by the VoIP server 406, the VoIP server 406 may forward the packets to the security system device 408. In one embodiment, the VoIP server 406 may forward the packets to the security system device 408 over the external network 404. Of course, however, the VoIP server 406 may forward the packets to the security system device 408 in any desired manner.

The security system device 408 may accordingly determine whether the packets include unwanted data. In one embodiment, the security system device 408 may compare the packets to known unwanted data, for determining whether the packets include unwanted data. In another embodiment, the security system device 408 may scan the packets for unwanted data.

As an option, a script, algorithm, etc. may be utilized for determining whether the packets include unwanted data. Just by way of example, if the packets match the known unwanted data, it may be determined that the packets include unwanted data. As an option, the known unwanted data may be stored in a database located on the security system device 408.

Table 1 illustrates one example of a field of an SIP packet that includes unwanted data. For example, the unwanted data may be included in a field of the packet utilized for indicating the source device 402 from which the packet originated, as shown in Table 1. It should be noted that the SIP packet field shown in Table 1 is set forth for illustrative purposes only and thus should not be construed as limiting in any manner.

TABLE 1

"<script x='''<sip:'src='http://malicious/heap/g.sr'>@192.168.2:5060>; tag=1"

The security system device 408 may further react based on the determination of whether the packets include unwanted data. In one embodiment, the security system device 408 may conditionally send the packets to a user device 414 (or optionally a plurality of user devices) based on the determination. Just by way of example, the security system device 408 may send the packets to the user device 414 if it is determined that the packets do not include unwanted data.

With respect to the present embodiment, the user device 414 may include any device capable of receiving the packets. For example, the user device 414 may include a device designated as a destination of the packets by the source device 402 from which the packets originated. In this way, a device to which the packets are destined may receive the packets if the packets do not include unwanted data.

As an option, the packets may be sent to the user device 414 via the VoIP server 406. Just by way of example, the security system device 408 may send the packets to the VoIP server 406, if it is determined that the packets do not include unwanted data. Further, the VoIP server 406 may send the packets over the internal network 410 to an internal server 412. The internal network 410 may include a LAN, for example. As another example, the internal network 410 may include an enterprise network.

In addition, the internal server 412 may include any server internally located with respect to the internal network 410. For example, the internal server 412 may interface communications received from the VoIP server 406 at the user device 414. As an option, the internal server 412 may include a security system thereon for performing any analysis (e.g. scanning, etc.) with respect to the packets for determining whether the packets include unwanted data. For example, the internal server 412 may analyze packets received utilizing a protocol other than the SIP.

Still yet, the internal server 412 may send the packets to the user device 414 (e.g. over the internal network 410, etc.). As another option, the user device 414 may also include a security system thereon for performing any analysis (e.g. scanning, etc.) with respect to the packets for determining whether the packets include unwanted data. For example, the user device 414 may analyze packets received utilizing a protocol other than the SIP.

Of course, as another example, the security system device 408 may block the packets from being sent to the user device 414, if it is determined that the packets include unwanted data. In one embodiment, the security system device 408 may block the packets by quarantining the packets, deleting the packets, etc. Accordingly, a device to which the packets are destined may be prevented from receiving the packets if the packets do not include unwanted data. Additionally, the packets may also be prevented from entering the internal network 410, if it is determined that the packets include unwanted data.

As yet another example, the security system device 408 may send an alert, if it is determined that the packets include unwanted data. In one embodiment, the security system device 408 may send the alert to the user device 414. In another embodiment, the security system device 408 may send the alert to a device of an administrator.

The alert may indicate that the electronic message associated with the packets includes unwanted data, as an option. As another option, the alert may include any information associated with the electronic message and/or the unwanted data. Further still, the alert may include options capable of being selected by a user of the user device 414 for responding to the electronic message (e.g. such as allowing the electronic message, blocking future packets from the source device 402, etc.).

While the security system device 408 is described above as reacting based on the determination of whether the packets include unwanted data, it should be noted that The VoIP server 406 may also be utilized for performing the reaction. For example, in one embodiment, in response to a determination of whether the packets include unwanted data, the security system device 408 may send an indication of whether the packets include unwanted data to the VoIP server 406. In this way, the VoIP server 406 may react based on the determination. Of course, as another option, the security system device 408 may send instructions to the VoIP server 406 indicating a reaction to be performed.

Figure 5:
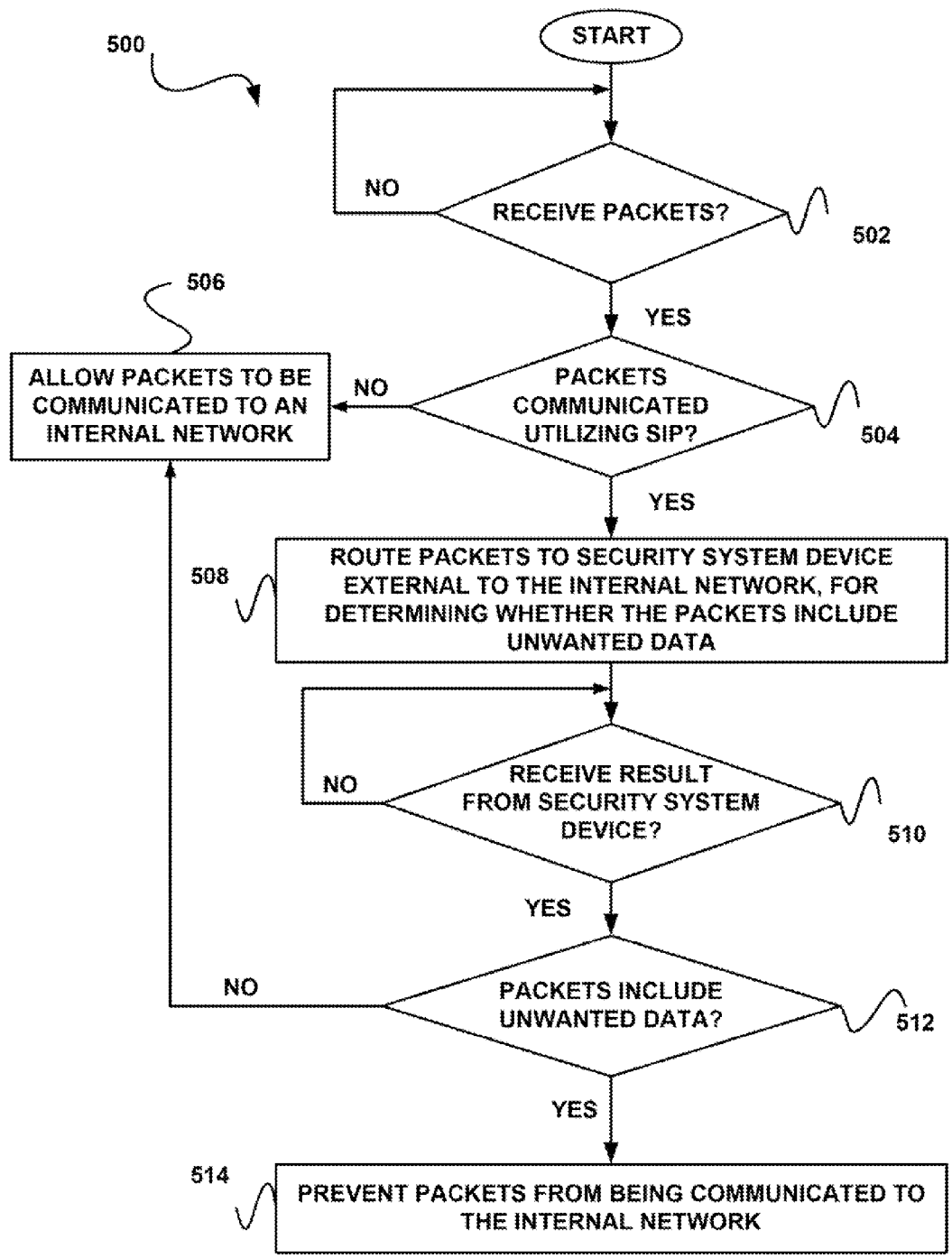
FIG. 5 shows a method for preventing unwanted data communicated via a session initiation protocol from being communicated to an internal network, in accordance with yet another embodiment.

FIG. 5 shows a method 500 for preventing unwanted data communicated via a session initiation protocol from being communicated to an internal network, in accordance with yet another embodiment. As an option, the method 500 may be carried out in the context of the architecture and environment of FIGS. 1-4. For example, the method 500 may be carried out utilizing the VoIP server 406 of FIG. 4. Of course, however, the method 500 may be carried out in any desired environment. Again, it should be noted that the aforementioned definitions may apply during the present description.

As shown in decision 502, it is determined whether packets are received. With respect to the present embodiment, the packets may include any packets associated with an electronic message. As an option, the packets may be received over a network (e.g. an external network, etc.).

If it is determined that packets are not received, the method 500 continues to wait for packets to be received. If, however, it is determined that packets are received, it is further determined whether the packets are communicated utilizing SIP. Note decision 504. For example, it may be determined whether the packets are received utilizing the SIP.

In one embodiment, a format of the packets may be analyzed for determining whether the packets are communicated utilizing the SIP. In another embodiment, a header of each of the packets may be analyzed for determining whether the packets indicate utilization of the SIP. Of course, however, it may be determined whether the packets are communicated utilizing the SIP in any desired manner.

If it is determined that the packets are not communicated utilizing the SIP, the packets are allowed to be communicated to an internal network, as shown in operation 506. For example, the packets may be allowed to be communicated a user device located in the internal network. Such user device may include a destination device indicated by the packets. Of course, the packets may optionally be scanned for unwanted data on the user device, at a device interfacing the user device, and/or any other device within the internal network.

If it is determined that the packets are communicated utilizing the SIP, the packets are routed to a security system device external to the internal network, for determining whether the packets include unwanted data. Note operation 508. In one embodiment, the security system device may be located in an external network. Thus, packets may be routed to the security system device over the external network.

In another embodiment, the security system device may include computer code for determining whether the packets include unwanted data. For example, the security system device may compare the packets to known unwanted data, etc. In this way, it may be conditionally determined whether the packets include unwanted data, based on whether the packets are communicated utilizing the SIP.

Moreover, as shown in decision 510, it is determined whether results are received from the security system device. With respect to the present embodiment, the results may include results of the determination made by the security system device regarding whether the packets include unwanted data. Thus, the results may indicate whether the packets include unwanted data.

If it is determined that the results have not been received, the method 500 continues to wait for the results to be received. In response to a determination that the results are received, it is further determined whether the packets include unwanted data. Note decision 512. In one embodiment, the determination may be based on the received results. For example, an indication within the results of whether the packets include unwanted data may be identified.

If it is determined that the packets do not include unwanted data, the packets are allowed to be communicated to the internal network, as shown in operation 506. If however, it is determined that the packets include unwanted data, the packets are prevented from being communicated to the internal network. Note operation 514. Just by way of example, the packets may be blocked, discarded, quarantined, etc. To this end, the internal network may be protected from entry of packets including unwanted data that are communicated utilizing the SIP.

While the various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium having instructions stored thereon that when executed cause one or more processors to:
   identify one or more packets associated with an electronic message received from a network, the one or more packets utilizing a session initiation protocol;
   determine that the electronic message is associated with a voice over Internet Protocol session utilizing the session initiation protocol for communicating the one or more packets over the network;
   determine the one or more packets include unwanted data, wherein determining the one or more packets include unwanted data comprises:
      sending the one or more packets to a security system module; and
      receiving, from the security system module, information indicative of a comparison of the one or more packets with known unwanted data; and
   react in response to the determination that the one or more packets include unwanted data.

2. The computer program product of claim 1, wherein the instructions that when executed cause the one or more processors to identify one or more packets comprise instructions to cause one or more processors to determine the electronic message comprises a voice message.

3. The computer program product of claim 1, further comprising instructions that when executed cause the one or more processors to determine the one or more packets are received from an external network.

4. The computer program product of claim 1, wherein the unwanted data includes malware.

5. The computer program product of claim 1, wherein the unwanted data includes a malicious link.

6. The computer program product of claim 1, further comprising instructions that when executed cause the one or more processors to report the unwanted data.

7. The computer program product of claim 1, wherein the instructions that when executed cause the one or more processors to react comprise instructions that when executed cause the one or more processors to block the unwanted data.

8. The computer program product of claim 6, wherein the instructions that when executed cause the one or more processors to block the unwanted data comprise instructions that when executed cause the one or more processors to block the unwanted data from reaching a user device.

9. The computer program product of claim 1, wherein the known unwanted data used for comparison comprises a copy of known unwanted data retrieved from a database, the database storing a plurality of instances of known unwanted data.

10. A method, comprising:
   receiving one or more packets of data associated with an electronic message from a network;
   detecting that the electronic message is associated with a voice over Internet Protocol session using a session initiation protocol for communicating the one or more received packets;
   passing the one or more received packets to a security system module for analysis;

receiving a determination from the security system module that the one or more received packets contain known unwanted data;

reacting in response to the determination.

11. The method of claim 10, further comprising determining the one or more packets were received from an external network.

12. The method of claim 10, wherein reacting comprises blocking the unwanted data.

13. The method of claim 12, wherein blocking the unwanted data comprises blocking the unwanted data from reaching a user device communicatively coupled to the network.

14. A system, comprising:
- a programmable device; and
- a security server module to execute on the programmable device, wherein the security server module is operational to:
  - examine a packet received from another device for unwanted data, the packet associated with an electronic message associated with a voice over Internet Protocol session utilizing a session initiation protocol for communicating the packet; and
  - send information indicative of a comparison of the packet with known unwanted data.

15. The system of claim 14, wherein the security server module is further operation to send results of the examination to the another device.

16. The system of claim 14, wherein the security server module is operational to examine the packet for unwanted data by comparing the packet with known unwanted data.

17. The system of claim 14, wherein the security server module is further operational to send the packet to one or more user devices over a network after a determination that the one or more packets do not include the unwanted data.

18. The system of claim 14, wherein the security server module is further operational to block the one or more packets if the examination determines that the packet contains unwanted data.

19. The system of claim 14, wherein the security server module is further operational to report the unwanted data if the examination determines that the packet contains unwanted data.

20. The system of claim 14, wherein the security server module is further operational to determine the electronic message is associated with a voice over Internet Protocol session.

21. The system of claim 14, wherein the security server module is further operational to block the electronic message from reaching a user device communicatively coupled to a network if the examination determines that the packet contains unwanted data.

22. The system of claim 14, wherein the unwanted data includes malware.

23. The system of claim 14, wherein the unwanted data includes a malicious link.

* * * * *